United States Patent [19]
Jonas

[11] Patent Number: 5,435,775
[45] Date of Patent: Jul. 25, 1995

[54] SHRIMP TRAY WITH VISUAL AND TACTILE SHRIMP SENSING MEANS

[75] Inventor: Gyula Jonas, Round Lake Beach, Ill.

[73] Assignee: Gregor Jonsson, Inc., Highland Park, Ill.

[21] Appl. No.: 213,435

[22] Filed: Mar. 14, 1994

[51] Int. Cl.⁶ .............................................. A22C 29/02
[52] U.S. Cl. ................................................ 452/2; 452/3
[58] Field of Search .......................................... 452/2, 3

[56] References Cited

U.S. PATENT DOCUMENTS

| 3,159,871 | 12/1964 | Jonsson | 452/3 |
| 3,247,542 | 4/1966 | Jonsson | 17/2 |
| 3,277,517 | 10/1966 | Jonsson | 17/45 |
| 3,528,125 | 9/1970 | Jones, Jr. | 452/3 |
| 3,566,437 | 3/1971 | Jonsson | 452/3 |
| 4,769,871 | 9/1988 | Betts | 17/48 |

OTHER PUBLICATIONS

Gregor Jonsson Operation Manual, p. B1, circa 1978–79.

Primary Examiner—Willis Little
Attorney, Agent, or Firm—Marshall, O'Toole, Gerstein, Murray & Borun

[57] ABSTRACT

A shrimp tray adapted for use in a shrimp processing machine has a stripe located contiguous to one end of the tray that allows an operator to visually orient a shrimp in the tray by locating the first segment of the shrimp in the tray relative to the stripe. A detent or ridge is disposed atop the stripe and permits an operator to further tactilely orient the shrimp in the tray by moving the shrimp along the tray length until the detent engages the shrimp segment.

15 Claims, 2 Drawing Sheets

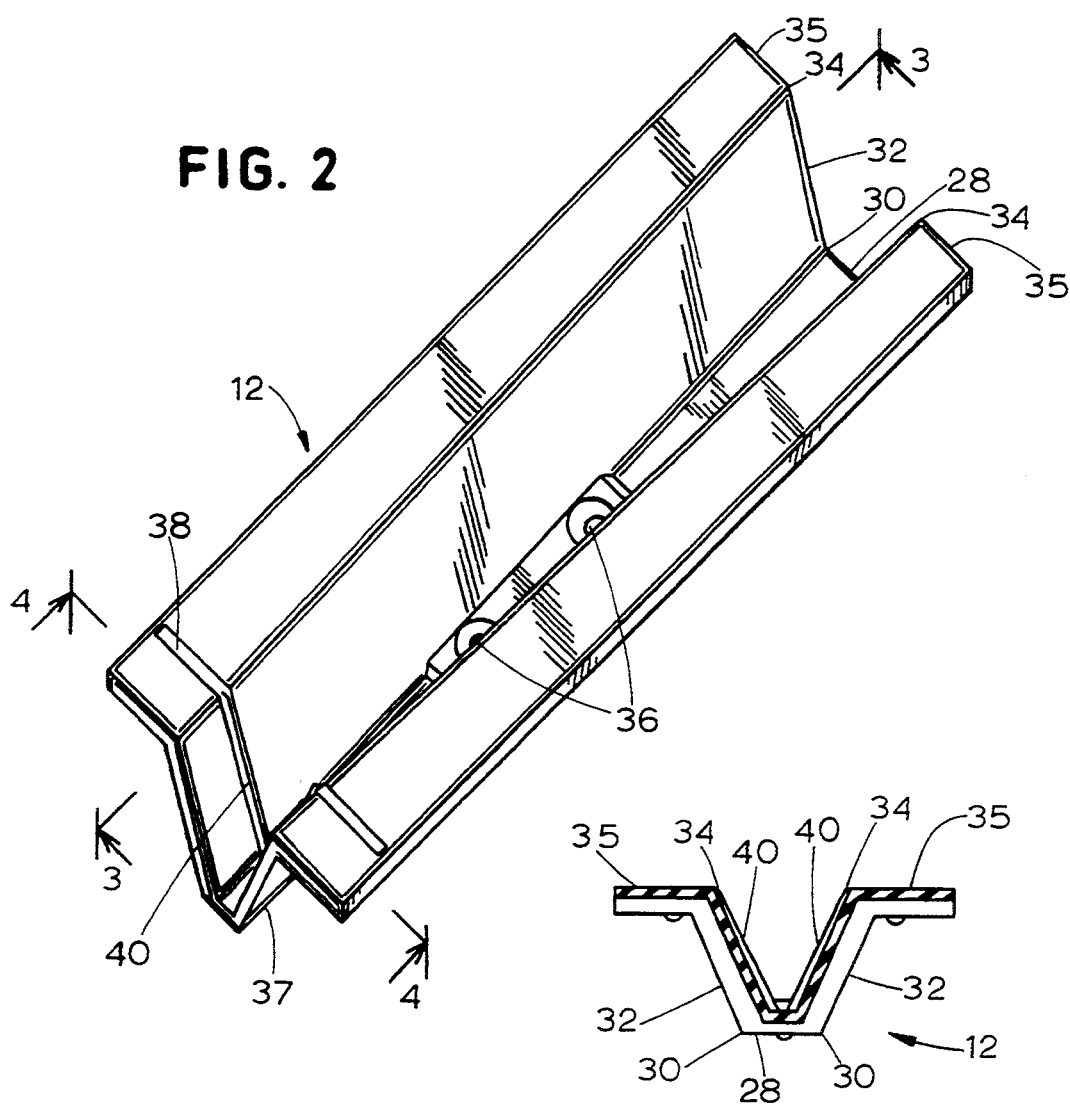
FIG. 2
FIG. 4
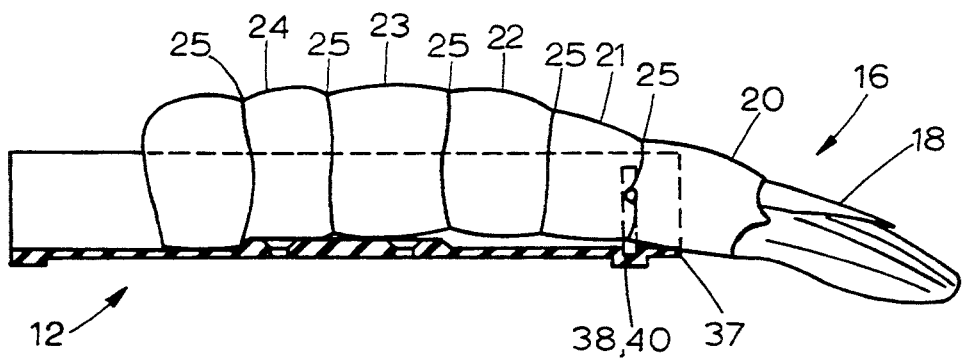
FIG. 3

SHRIMP TRAY WITH VISUAL AND TACTILE SHRIMP SENSING MEANS

TECHNICAL FIELD

The present invention relates generally to shrimp processing machines, and more particularly to orienting shrimp on a feed tray which delivers shrimp to be processed to a shrimp delivery system.

BACKGROUND ART

Various production machines are presently available in the shrimp processing industry for processing shrimp. Examples of these shrimp processing machines are disclosed in Jonsson, U.S. Pat. No. 3,247,542 and Betts, U.S. Pat. No. 4,769,871. Shrimp are fed to the processing machines by an operator who places the shrimp in a plurality of trays. The feed trays are attached to a conveyor belt which transports the shrimp to a rotatable transport wheel. Clamp assemblies on the wheel are actuated to grasp a shrimp and remove it from a tray and transport it to various work stations where the shrimp shell is cut, and the shell and vein are removed from the shrimp.

To efficiently process the shrimp past the various work stations, it is important that a shrimp be properly located in a rotating clamp assembly. Further, it is important that a shrimp be properly oriented in a feed tray whereby it can be grasped by the clamping assembly. If a shrimp is not properly oriented in the feed tray, a clamp assembly will not properly engage the shrimp, which serves to cause a number of problems. One problem arises in that the body or meat portion of a shrimp has only limited structural strength which is weakest at the portion where the tail adjoins the shrimp body. If a shrimp is improperly grasped by a clamp assembly due to the fact that the shrimp is seated improperly in a tray, the body may tear during shell removal. Further, if improper shrimp alignment occurs in a clamp assembly, the shell and shrimp body may be cut in the wrong location, resulting in improper shell, vein and/or meat removal. Improper shrimp orientation on the tray can lead to either the destruction of a shrimp during the processing operation or an increased production cost due to the fact that the shrimp must be reprocessed.

Various methods have been employed to facilitate proper orientation of shrimp in the feed trays. Typically, a visual marking has been placed on the tray whereby an operator can orient the shrimp on the tray by locating the shrimp relative to the marking. Markings of this type are disclosed, for example, in Jonsson, U.S. Pat. Nos. 3,247,542 and 3,277,517. This visible orientation system, however, has not been entirely satisfactory. While the visual markings provide for a gross adjustment in positioning a shrimp on a tray, the operator's positioning procedure sometimes is quite subjective in locating a shrimp relative to the visual marking on the tray. Thus, there remains a need for an improved device and method which will ensure a more consistent and correct orientation of a shrimp on a feed tray. What is particularly desired is to have a means for providing both a gross and discrete adjustment of a shrimp on a feed tray whereby a shrimp will be properly positioned on a tray so that it can be grasped by a clamp assembly on a rotatable transport wheel and delivered to various work stations which ultimately will produce consistently properly processed shrimp meat.

SUMMARY OF THE INVENTION

The invention disclosed and claimed herein serves to obviate the problems sometimes present with conventional shrimp processing machines. Briefly, the present invention comprises a shrimp feed tray adapted for connection to an endless conveyor belt which feeds shrimp to a rotatable transport wheel in a shrimp processing machine. The tray includes a retaining means for maintaining a shrimp in the tray, visual sensing means for grossly orienting the shrimp in the tray, and tactile sensing means for further discretely orienting the shrimp in the tray.

According to one aspect of the present invention, the tray comprises a base, a pair of side walls extending upward and outward from the base, and fins extending perpendicularly outward from the top edges of the side walls. Preferably, the base is tapered and gradually narrows along its length to correspond to the general overall tapered shape of a shrimp. The visual sensing means comprises a stripe disposed contiguous to the narrow end of the tray. An operator can visually orient the first segment of the shrimp relative to the stripe whereby the tail section of the shrimp is located on one side of the stripe and the remainder of the shrimp is on the opposite side of the stripe. The tactile sensing means comprises a detent or ridge disposed along each side wall of the tray that preferably is positioned at the location of the stripe. The tactile sensing means allows an operator to further discretely orient the shrimp by engaging the shrimp to contact the detents generally at the joint between the first shrimp section and an adjacent shrimp section. When an operator tactilely senses that the detents have contacted this particular joint, it indicates to the operator that the shrimp is positioned properly on the feed tray.

According to another aspect of the present invention, a method for orienting a shrimp on a feed tray for use in a shrimp processing machine comprises a first step of an operator placing the shrimp in a tray with the tail of the shrimp extending outward beyond one of the two ends of the tray. The operator then grossly orients the shrimp in the tray by visually orienting a shrimp segment or joint relative to a visual stripe which is located contiguous to one end of the tray. Lastly, the operator discretely orients the shrimp by hand, moving the shrimp along the base of the tray until the operator senses that the desired joint, which separates the first shrimp segment from the adjacent segment, contacts one or both detents located on the tray side walls. With a shrimp located in this position, the shrimp tail extends the desired distance beyond one end of the tray and the shrimp is oriented to be grasped properly by a rotating clamp assembly whereby the shrimp is removed from the tray and thereafter transported past a number of work stations which process the shrimp.

BRIEF DESCRIPTION OF THE DRAWINGS

The features of the present invention believed to be novel are set forth with particularity in the appended claims. The invention, together with further objects and advantages thereof, may best be understood by making reference to the following description, taken in conjunction with the accompanying drawings, in the several figures of which like reference numerals indicate identical elements, and wherein:

FIG. 2 shows a perspective view of an individual shrimp tray of the present invention;

FIG. 3 shows a reduced scale, partial side, section view taken along lines 3—3 in FIG. 2 showing a shrimp properly oriented in a shrimp tray by means of the visual and tactile sensing means of the present invention; and, FIG. 4 shows an enlarged, section view taken along lines 4—4 in FIG. 2.

DESCRIPTION OF THE PREFERRED EMBODIMENT

Figure 1:
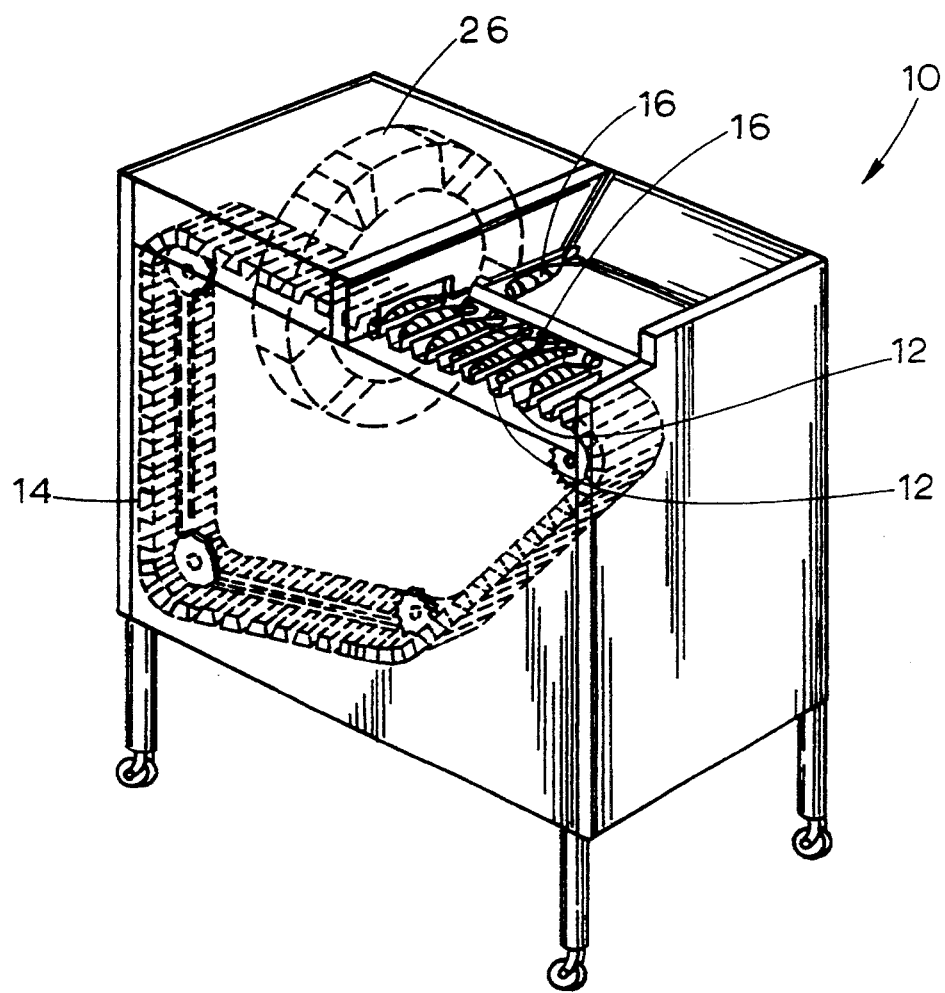
FIG. 1 shows a perspective view of a shrimp processing machine incorporating shrimp trays of the present invention.

Referring to the drawings and particularly FIG. 1, shrimp processing machine 10 of the type shown and disclosed in Jonsson, U.S. Pat. No. 3,247,542, whose specification, including drawings, is incorporated by reference herein, includes a plurality of trays 12 attached to a movable, endless conveyor belt 14. Referring also to FIG. 3, shrimp 16 comprises tail 18 and a plurality of joined segments, indicated by numerals 20–24, which enclose the shrimp body or meat. A joint 25 is located between adjacent segments. First segment 20 is located adjacent to shrimp tail 18 and second segment 21.

In the course of feeding shrimp to be processed to machine 10, an operator will place a shrimp 16 in feed tray 12. Conveyor belt 14 transports shrimp 16 in tray 12 to a rotatable transport wheel 26, which is positioned for rotation perpendicular to tray 12. A clamp assembly fastened to wheel 26, and described, for example, in Betts, U.S. Pat. No. 4,439,893, is actuated whereby it grasps the shrimp tail 18 and pulls the shrimp 16 from tray 12 onto the rotating clamp assembly. The shrimp and clamp assembly then rotate past several spaced work stations where the shrimp is washed, cut, and the shell and vein are separated from the shrimp body or meat.

Referring to FIG. 2, shrimp feed tray 12 is shown having a length substantially greater than its width. Tray 12 comprises base 28 with two spaced side edges 30. Base 28 tapers along the length of the tray to correspond somewhat to the tapered shape of a shrimp. A pair of side walls 32, each having a top edge 34, extend upwardly and angle outwardly from base side edges 30. A pair of fins 35 extend perpendicularly outward from top edges 34 of side walls 32. Tray 12 is connected to the conveyer belt 14 by standard fasteners inserted through the pair of holes 36 located near the center of base 28.

Because of the design of shrimp processing machine 10 and its shrimp clamping assemblies, a shrimp 16 must be oriented in feed tray 12 whereby the shrimp tail 18 extends outwardly a suitable, discrete distance beyond tray end 37 (FIG. 3) in order that shrimp 16 can be grasped properly by a clamp assembly.

Tray 12 includes both visual sensing means and tactile sensing means to facilitate proper orientation of shrimp 16 in tray 12. The visual sensing means comprises stripe 38 which preferably extends across fins 35, side walls 32 and base 28 of tray 12. Stripe 38 is disposed contiguous to end 37 of tray 12. Initially, an operator will visually orient a shrimp to be processed on tray 12 whereby shrimp tail 18 extends beyond tray end 37 so that at least tail 18 and a portion of first shrimp section 20 are freely exposed to a rotating clamp assembly. With the shrimp in this position, an operator then will visually orient shrimp 16 on tray 12 by visually and grossly locating joint 25 between shrimp segments 20 and 21 relative to stripe 38.

While in many instances this visual alignment of a shrimp is satisfactory, it is not satisfactory in all instances in that the ability of one operator versus another to visually orient a shrimp relative to a tray end varies from operator to operator. Accordingly, what is required is to provide a further more discrete means of positioning a shrimp on a feed tray. To accomplish this adjustment procedure, a tactile sensing means is employed.

The tactile sensing means comprises detent or ridge 40 which is disposed on at least one of tray side walls 32 and preferably at the location of stripe 38. Detents 40, as shown in FIG. 4, extend outward from the side walls 32 and taper along the height of the side walls 32 such that detents 40 are wider near tray base 28 and taper inwardly toward respective side walls 32 as the detents approach side wall top edges 34. The detents 40 preferably are integral with tray 12 and extend outward from side walls 32 a sufficient amount so that an operator can tactilely feel or sense the detent when running a finger along the inside surface of a side wall 32. Detents 40 allow an operator to orient shrimp 16 in feed tray 12 by sliding shrimp 16 laterally back and forth along tray base 28 until the operator senses or feels detents 40 engaging the joint 25 between adjacent shrimp segments 20 and 21.

In operation, an operator will place shrimp 16 in feed tray 12, the shrimp tail 18 overlying tray end 37. Initially, shrimp 16 is visually aligned whereby the joint 25 between adjacent shrimp sections 20 and 21 is positioned grossly and visually relative to stripe 38. Next, an operator will more discretely position shrimp 16 by sliding the shrimp 16 along the tray base 28 until the operator tactilely senses at least one detent 40 engage the joint 25 between the first shrimp section 20 and adjacent section 21. As a result of both the visual and tactile sensing operation, shrimp 16 is properly oriented in feed tray 12 whereby the desired amount of shrimp 16 extends beyond tray end 37 and is available for capture by a rotating clamping assembly.

The tray used to feed the shrimp and the detent are made of material from the acetal family, such as 3M Delrin or Celanese M-90-H. While stripe 38 and detents 40 have been aligned on tray 12, it is appreciated that the adjustment system could be achieved with the stripe 38 in one position and the detents 40 spaced from it.

While a particular embodiment of the present invention has been shown and described, modifications may be made, and it is therefore intended to cover all such changes and modifications as fall within the true spirit and scope of the invention.

It is claimed:

1. A tray adapted for use with a shrimp processing machine for processing one or more shrimp having a plurality of joined shrimp sections, said tray comprising:
   retaining means for maintaining a shrimp to be processed in the tray;
   visual sensing means for grossly orienting the shrimp in the tray; and
   tactile sensing means comprising a detent disposed on the tray for further discretely orienting a shrimp located in the tray.

2. The tray of claim 1, wherein the visual sensing means comprises a stripe disposed on the tray for visually orienting the shrimp in the tray by locating the first segment of the shrimp relative to the stripe.

3. The tray of claim 1, wherein the shrimp retaining means comprises a base having a pair of spaced side edges, a width and a length substantially greater than said width.

4. The tray of claim 3, wherein the base tapers along its length to correspond to the shape of a shrimp.

5. The tray of claim 4, wherein the visual sensing means and tactile sensing means are contiguous to the narrow end of the tray.

6. The tray of claim 3, further comprising a pair of side walls extending upward from said base edges, each side wall having a top edge.

7. The tray of claim 6, wherein each wall extends angularly outward from a base edge.

8. The tray of claim 6, further comprising a pair of fins, each fin extending perpendicularly outward from the top edge of a wall.

9. A tray adapted for use with a shrimp processing machine for processing one or more shrimp having a plurality of joined shrimp segments, comprising:
 a base having a pair of spaced side edges, a width, and a length substantially greater than said width;
 a pair of side walls, each having a top edge and extending upward and angularly outward from a base edge;
 a pair of fins, each fin extending perpendicularly outward from the top edge of a wall;
 a stripe disposed on the tray for visually orienting a shrimp in the tray by locating the first segment of the shrimp relative to the stripe; and
 a tactile sensing means comprising a detent disposed on the tray for further orienting the shrimp in the tray by engaging a portion of said shrimp with said tactile sensing means to further orient said shrimp relative to said tray.

10. The tray of claim 9, wherein the said detent is disposed on the walls of the tray.

11. The tray of claim 10, wherein the detent is disposed at the location of the stripe.

12. The tray of claim 11, wherein the detent tapers inwardly as the detent extends along the height of the walls, such that the detent is widest near the base.

13. The tray of claim 12, wherein the shrimp tray base tapers along the tray length to correspond to the shape of the shrimp.

14. The tray of claim 13, wherein the stripe and the detent are contiguous to the narrow end of the tray.

15. A method of orienting a shrimp on a tray for use in a shrimp processing machine for processing one or more shrimp having a tail and a plurality of joined shrimp segments, comprising steps of:
 (A) placing the shrimp in the tray with the tail of the shrimp extending outward from one end of the tray;
 (B) initially orienting the shrimp in the tray by visually orienting the first segment of the shrimp relative to a stripe located on said tray whereby the shrimp is located contiguous to one end of the tray; and
 (C) tactilely orienting the shrimp in the tray by moving the shrimp laterally along the base of the tray until the first segment of the shrimp engages a detent located in said tray whereby said shrimp is positioned relative to said detent.

* * * * *